Nov. 7, 1967 G. C. SAMSON ET AL 3,351,830
SERVO SYSTEM INCLUDING ARMATURE AND FIELD CONTROL
OF PLURAL MOTORS CONNECTED IN TORQUE OPPOSITION
Filed Feb. 26, 1965

INVENTORS
GEORGE C. SAMSON
JOHN ENDLICH

BY Claude Funkhouser
ATTORNEY
Lawrence A. Hoffman
AGENT

United States Patent Office 3,351,830
Patented Nov. 7, 1967

3,351,830
SERVO SYSTEM INCLUDING ARMATURE AND FIELD CONTROL OF PLURAL MOTORS CONNECTED IN TORQUE OPPOSITION
George C. Samson, St. James, and John Endlich, Great Neck, N.Y., assignors, by mesne assignments, to the United States of America as represented by the Secretary of the Navy
Filed Feb. 26, 1965, Ser. No. 435,760
4 Claims. (Cl. 318—48)

ABSTRACT OF THE DISCLOSURE

Means for operating a servo motor with an RMS armature current which does not exceed the motor rating yet allows the motor to develop torque above the rated value for short intervals of time without danger of heating from excess armature current.

---

Figure 1:
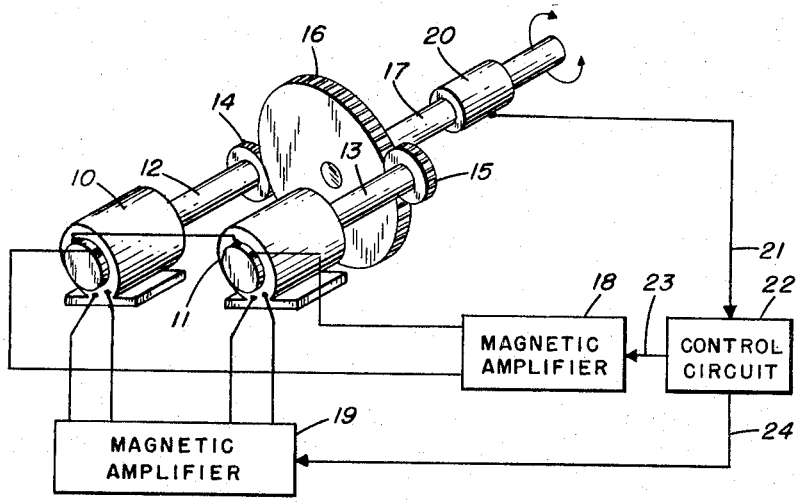

The present invention relates to servo systems and more particularly to servo systems for increasing torque beyond its rated value.

A servo system by definition comprises a special type closed loop, controlled, system capable of producing a controlled output at a high energy or power level in response to a low energy level input signal. The components making up a servo system are a servo amplifier, a servo motor and a measuring or control device. In addition, a servo mechanism employs negative feedback, which makes possible a comparison of the reference input signal with the measured value of the controlled output motion. A low energy level error signal is thereby produced and the servo amplifier amplifier and servo motor respond to the error signal to cause the output motion to approach the desired value. The input signal may be in the form of an electric voltage or current or even a mechanical motion, but the output of a servo mechanism, however, is always a motion of a shaft or a similar mechanical element. As stated previously, the difference between the measured input and the measured output is designated as an error signal and it is this error signal which determines the operation of the servo mechanism.

Some systems for increasing torque beyond the rated value are available but since the armature current of the servo motor is usually directly controlled by the error signal, these systems have the disadvantage of allowing armature current to rise as a function of noise in the error signal. One such system uses only field control for an error up to a certain value and then switches to armature control only in order to achieve the full torque capability of the motor. This technique has the additional disadvantage of requiring the matching of field to armature switching levels and causing the loss of the faster field time constant when in the armature control mode.

Another system employs a form of automatic gain control in which the field circuit sensitivity is reduced as armature current is increased. This method has the disadvantage of being non-linear and requiring the generation of an attenuation characteristic which may be difficult to shape.

Accordingly, it is an object of the present invention to provide means for increasing the torque available from a servo motor beyond its rated limit.

It is a further object of the present invention to provide means to increase the torque available from a servo motor beyond its rated limit while still operating the motor within its RMS current rating.

It is a further object of the present invention to provide a system of the above-described type in which the armature current is not sensitive to noise in the error signal.

It is a further object of the present invention to provide a system as indicated above which is simple to construct and requires no special matching at the transition between normal and increased torque operation.

It is a further object of the present invention to provide a system as indicated above which automatically protects the motor from damage by overheating either from increased torque demands or because of excessive noise in the error signal.

The system of the present invention provides the above objects by the use of a novel control system which responds to the servo error signal to switch the motor between normal and increased torque operation.

When the error signal is of such a value as to require more torque than is available with the normal value of armature current, the current is increased by a factor of 2 and the field circuit sensitivity is decreased by a factor of 2 thus preserving the overall scale factor of the power drive. Since the rated RMS current is between the normal and doubled values, it is possible to control the duty cycle of the motor in order not to exceed the RMS value. An electronic memory circuit functions to control the duty cycle and to change the system from normal to increased torque operation, if the duty cycle has been partially used, then the doubled armature current will be applied only for a limited time as determined by the memory circuit. If the duty cycle has been completely used, then the memory circuit will not allow double armature current even though increased torque is demanded. Thus, the motor is prevented from being overheated.

Figure 2:
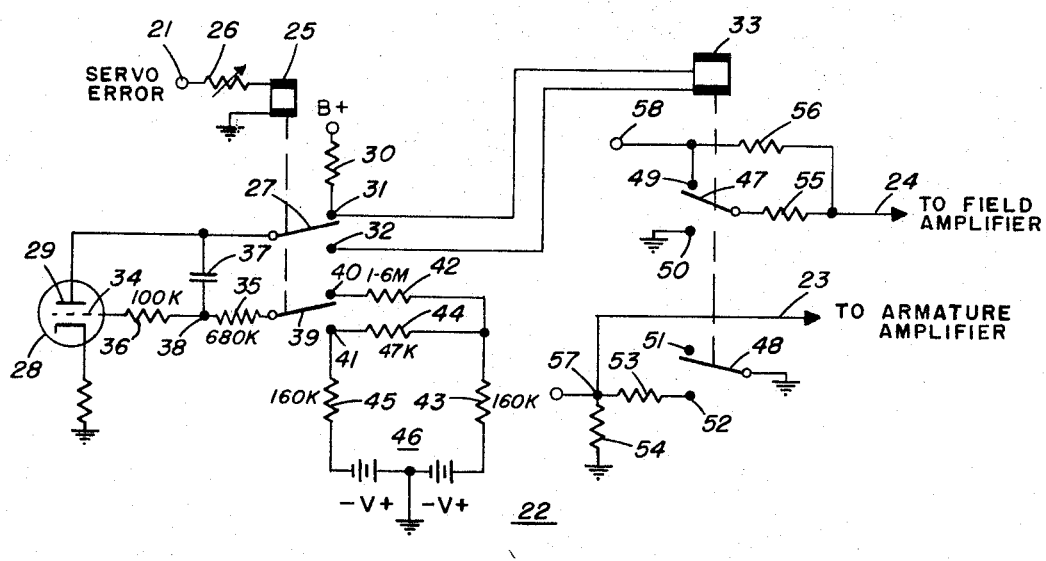

The exact nature of this invention, as well as other objects and advantages thereof, will be readily apparent from consideration of the following specification and the annexed drawings in which:

FIG. 1 shows one system in which the present invention may be advantageously employed; and FIG. 2 shows a preferred embodiment of the control system of the present invention.

Referring now to FIG. 1, a basic servo system which may employ the present invention may comprise two servo motors 10 and 11 connected, respectively, by shafts 12 and 13 and gears 14 and 15 to gear 16 on output member 17. The two servo motors are equally geared to the output member, each developing torque in opposing directions. The armatures of motors 10 and 11 may be connected in series across a magnetic amplifier current regulator 18, the output of which is non-reversible. The fields of motors 10 and 11 may be separately excited from a common dual output magnetic amplifier 19. The outputs of this amplifier are also non-reversible and their difference is proportional to the servo error signal derived from a suitable output transducer 20, connected to the output member 17. Output transducer 20 provides a servo error signal over lead 21 to control system 22, which may provide the input to the armature magnetic amplifier 18 and to the field magnetic amplifier 19 over leads 23 and 24, respectively. Thus, it may be seen that the sense of the net developed torque is a function of the field control and only the value of the armature current determines the effective torque constant of the motor pair.

FIG. 2 shows a simple embodiment of a suitable control circuit 22. A relay 25 is shown connected to the servo error input on lead 21 through a sensitivity control resistor 26. Arm 27 of relay 25 is in the plate circuit of a suitable vacuum tube 28, and serves to connect plate 29 of the vacuum tube to a source of B+ through resistor 30. When relay 25 is in its normal position as shown, the current path for plate 29 is provided directly through arm 27 from contact 31. However, when relay 25 is actuated, arm 27 is connected to contact 32 and the plate current path includes the coil of relay 33.

Connected between plate 29 and grid 34 of vacuum tube 28, is a resistor 36 and a capacitor 37. Resistor 36 and capacitor 37 are connected at point 38 while another resistor 35 is connected between point 38 and arm 39 of relay 25. When relay 25 is in its unenergized condition, arm 39 is connected to contact 40 and when relay 25 is energized, arm 39 is connected to contact 41. Resistors 42 through 45 are suitably connected to provide voltage dividers across the two ends of a double ended power supply 46, resistors 43 and 45 being of like magnitude, and in nature of 160K. As may be seen, when arm 39 is connected to contact 40 the total resistance seen at point 38 is larger by an amount equal to the value of resistor 42 than that seen when arm 39 is connected to contact 41. Resistor 42 is very large and is in the order of 1.6 meg. The time constant provided is therefore varied by the position of arm 39; when relay 25 is released, the discharge circuit for capacitor 37 has a slower time constant than when relay 25 is energized due to the fact that resistor 42 is now in the discharge path. Further, by proper selection of the values resistors 42 through 45, the voltage appearing at contacts 40 and 41 as a result of double ended voltage supply 46 may be suitably adjusted.

Relay 33 includes arms 47 and 48 which may be switched between contacts 49 or 50 and 51 or 52, respectively. As may be seen, in the unenergized state of relay 33, arm 48 is not connected, but in the energized state, it serves to connect resistor 53 to ground through contact 52. A further resistor 54 is connected between ground and resistor 53 so that the resistance appearing at point 57 may be suitably varied by energizing relay 33. The excitation signals for the armatures of servos 10 and 11 may be connected at point 57; therefore, the sensitivity of the servo motors to the signals on lead 23 may be increased or decreased by the energization or de-energization, respectively, of relay 33.

Contact 47 of relay 33 serves to increase or decrease the sensitivity of the servo motor field current. A suitable field excitation signal may be provided at contact 58 for connection to lead 24. When relay 33 is in its unenergized state, contact 58 and lead 24 are connected by a parallel combination of resistors 55 and 56 to arm 47 and contact 49. However, when relay 33 is energized, resistors 55 and 56 provide a voltage divider through contact 50 and arm 47. Therefore, it may be seen that when relay 33 is energized, the sensitivity to signals appearing at terminal 58 of the field windings of servo motors 10 and 11 is less than when relay 33 is de-energized.

In operation, when a normal servo error signal is applied to the coil of relay 25, the current therethrough is too small to pull in the relay. Therefore, plate current for tube 28 passes through resistor 30, contact 31, and arm 27. The coil of relay 33 is open since it is connected to contact 32. Also, contact 49 and arm 47 put resistors 55 and 56 in parallel to provide the normal field circuit sensitivity. When the servo error signal exceeds a minimum level determined either by suitable choice of relay 25, or by adjustment of resistor 26, relay 25 is energized. The coil of relay 33 is then in series with the plate 29 through contact 32 and arm 27 of relay 25, and the initial plate current causes relay 33 to be energized. This causes resistors 53 and 54 to be put in parallel through contact 52 and arm 48 of relay 33, to provide the armature excitation for increased torque operation. Arm 47 of relay 33 serves to decrease the field current sensitivity by grounding one side of resistor 55 to contact 50. Tube 28 along with capacitor 37 and its associated voltage divider circuit serve as a modified Miller integrator to control the duty cycle of increased torque delivery. Assume, for example, that the permissible ratio of time for normal to increased torque operation is 3 to 1. This means that increased torque may be delivered for approximately 15 seconds out of every minute. Thus, when relay 25 is energized, arm 39 switches the grid 34 of tube 27 from a positive voltage at contact 40 to a negative voltage at contact 41 on the voltage divider network consisting of resistors 43 through 45. This causes the tube to drive toward cut-off through the time constant of capacitor 37 and resistor 35, resistor 42 being open circuited. If the servo error signal remains large enough to keep relay 25 in its energized condition for longer than the permissible portion of the duty cycle, then the decreasing plate current will cause relay 33 to release after approximately 15 seconds. If, however, before the fifteen second period has elapsed, the servo error signal decreases sufficiently to de-energize relay 25, contact 32 opens and relay 33 is de-energized. Arms 47 and 48 of relay 33 return to contacts 49 and 51, respectively, and the normal field and armature sensitivities are restored. In addition, when arm 39 is returned to contact 40, a positive voltage is restored to terminal 40, and to the time constant provided by resistor 35, and the series combination of resistor 42. Since the time constant seen at terminal 40 differs from that seen at terminal 41, only by the series inclusion of resistor 42, at terminal 40, it is evident that the discharging time for capacitor 37 through contact 40 is greater than that through contact 41. By proper selection of the value of resistor 42, the discharging time may be chosen so the proper duty cycle is provided. In this case, since the duty cycle may be 3 to 1, the value of resistor 42 must be chosen so that the time for capacitor 37 to return to its initial value is approximately 45 seconds. Therefore, if at any time during the 45 second period, relay 25 is re-energized, then a permissible time for increased torque delivery will be decreased in proportion to the degree to whicht capacitor 37 has returned to its initial discharged condition. Thus, it may be seen that the proper duty cycle is achieved, and that no danger of motor damage exists even though torque in excess of the rated value is being delivered.

Obviously, many modifications of the embodiments of FIGS. 1 and 2 may be made without departure from the scope of the present invention. For example, in FIG. 1, the use of two opposed motors 10 and 11 is not necessary, the concepts of the present invention may be readily adapted for use with a single motor delivering torque in one or both directions. Similarly, the circuitry shown in FIG. 2 is by no means intended to be an exclusive embodiment of the present invention, since a wide variety of suitable switching circuits may be comprehended by those skilled in the art.

Therefore, having fully described the invention, what is claimed is:

1. A servo system for controlling output torque comprising:
    a first motor developing torque in one direction;
    a second motor developing torque in another direction;
    means for measuring the composite rotational output of the two motors and generating an error signal indicative of this movement;
    circuit control means activated in response to the error signal;
    first amplifier means for applying part of the output of the control means through the armatures of the first and second motors; and
    a second amplifier means for applying another part of the output of the control means to the field of the first and second motors, whereby the motors will develop torque in excess of their rated values for short intervals of time.

2. The servo system of claim 1 wherein the control means contains means for doubling the armature current to the motors.

3. The servo system of claim 2 wherein the control means contains means for halving the field sensitivity of the motors.

4. The servo system of claim 3 wherein the control means contains an integration circuit for controlling the duty cycle of the motors whereby the motors are protected from over-heating during a period of elevated torque.

References Cited

UNITED STATES PATENTS

| 2,754,463 | 7/1956 | Hansen et al. | 318—434 XR |
| 2,916,685 | 12/1959 | Genuit | 318—513 XR |
| 3,024,401 | 3/1962 | Dinger | 318—513 XR |
| 3,060,367 | 10/1962 | Richards et al. | 318—513 XR |
| 3,090,902 | 5/1963 | Wolf | 318—513 XR |

ORIS L. RADER, *Primary Examiner.*

B. DOBECK, *Examiner.*

G. R. SIMMONS, *Assistant Examiner.*